(12) United States Patent
Wu et al.

(10) Patent No.: US 12,073,592 B2
(45) Date of Patent: Aug. 27, 2024

(54) QUANTIZATION APPARATUS, QUANTIZATION METHOD, AND PROGRAM

(71) Applicant: NIPPON TELEGRAPH AND TELEPHONE CORPORATION, Tokyo (JP)

(72) Inventors: Xiaojun Wu, Musashino (JP); Masaki Kitahara, Musashino (JP); Atsushi Shimizu, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 347 days.

(21) Appl. No.: 17/595,125

(22) PCT Filed: May 23, 2019

(86) PCT No.: PCT/JP2019/020468
§ 371 (c)(1),
(2) Date: Nov. 9, 2021

(87) PCT Pub. No.: WO2020/235081
PCT Pub. Date: Nov. 26, 2020

(65) Prior Publication Data
US 2022/0222860 A1    Jul. 14, 2022

(51) Int. Cl.
*G06K 9/36* (2006.01)
*G06T 3/40* (2006.01)
*G06T 9/00* (2006.01)

(52) U.S. Cl.
CPC . *G06T 9/00* (2013.01); *G06T 3/40* (2013.01)

(58) Field of Classification Search
CPC .. H04N 19/124; H04N 19/126; H04N 19/136; H04N 19/182; H04N 19/50;
(Continued)

(56) References Cited

U.S. PATENT DOCUMENTS 4,683,494 A * 7/1987 Furukawa ............ H04N 19/112
  375/E7.263
8,897,359 B2 * 11/2014 Regunathan ......... H04N 19/172
  375/240.03

FOREIGN PATENT DOCUMENTS

JP    S59117384 A    7/1984
JP    S6146685 A     3/1986
(Continued)

OTHER PUBLICATIONS

Sakae Okubo et al., Impress Standard Textbook Series H.265 / HEVC Textbook, Impress Japan Co., Ltd., Oct. 21, 2013, pp. 11-13.

*Primary Examiner* — Duy M Dang
(74) *Attorney, Agent, or Firm* — Harness, Dickey & Pierce, P.L.C.

(57) ABSTRACT

A quantization apparatus includes: an imaging unit that converts statistical data at a position in a real space into a pixel value of a coordinate, which is associated with the position, in an image; and a derivation unit that derives a quantization parameter corresponding to a quantization width of the pixel value for each of one or more positions in the real space with respect to a part or a whole of the image. The quantization apparatus may further include a purpose acquisition unit that acquires information indicating a purpose related to statistics. The derivation unit may derive the quantization parameter corresponding to the quantization width that is larger as the pixel value is larger.

5 Claims, 11 Drawing Sheets

(58) Field of Classification Search
CPC .... G06T 3/40; G06T 9/00; G06T 9/05; G06T 9/07; G06T 9/08; G06F 16/7864; H03M 7/60; H03M 7/302; H03M 7/6041
USPC .......................................... 382/232, 248–253
See application file for complete search history.

(56) References Cited

FOREIGN PATENT DOCUMENTS

| | | |
|---|---|---|
| JP | S62203484 A | 9/1987 |
| JP | 2018128731 A | 8/2018 |

\* cited by examiner

Fig. 2

| | x → | | | | | | 100 |
|---|---|---|---|---|---|---|---|
| 10 | 11 | 12 | 15 | 16 | 12 | 156 | 10 |
| 15 | 16 | 17 | 18 | 19 | 20 | 21 | 22 |
| 20 | 21 | 22 | 23 | 24 | 25 | 26 | 27 |
| 20 | 21 | 22 | 23 | 24 | 25 | 26 | 27 |
| 21 | 22 | 23 | 25 | 25 | 26 | 27 | 28 |
| 98 | 99 | 100 | 102 | 102 | 103 | 104 | 105 |
| 6 | 6 | 6 | 6 | 6 | 6 | 6 | 6 |
| 50 | 51 | 52 | 53 | 54 | 55 | 57 | 57 |

101 — leftmost bold cell; 108 — rightmost bold cell
102, 103, 104, 105, 106, 107 — columns

Fig. 3

| | x → | | | | | | 100 |
|---|---|---|---|---|---|---|---|
| 10 | 11 | 12 | 15 | 16 | 12 | 150 | 10 |
| 15 | 16 | 17 | 18 | 19 | 20 | 21 | 22 |
| 20 | 21 | 22 | 23 | 24 | 25 | 26 | 27 |
| 20 | 21 | 22 | 23 | 24 | 25 | 26 | 27 |
| 21 | 22 | 23 | 25 | 25 | 26 | 27 | 28 |
| 95 | 95 | 100 | 100 | 100 | 100 | 100 | 105 |
| 6 | 6 | 6 | 6 | 6 | 6 | 6 | 6 |
| 50 | 50 | 50 | 50 | 50 | 55 | 55 | 55 |

101 — leftmost bold cell; 108 — rightmost bold cell
102, 103, 104, 105, 106, 107 — columns

Fig. 4

| | | | | | | | |
|---|---|---|---|---|---|---|---|
| 0 | 0 | 0 | 0 | 0 | 0 | 6 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 3 | 4 | 0 | 2 | 2 | 3 | 4 | 0 |
| 0 | 0 | 0 | 0 | 0 | 0 | 0 | 0 |
| 0 | 1 | 2 | 3 | 4 | 0 | 2 | 2 |

Fig. 7

|   |   |   |   |   |   |   |   |
|---|---|---|---|---|---|---|---|
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

Fig. 8

|    |    |     |     |     |     |     |     |
|----|----|-----|-----|-----|-----|-----|-----|
| 10 | 11 | 12  | 15  | 16  | 12  | 150 | 10  |
| 15 | 16 | 17  | 18  | 19  | 20  | 21  | 22  |
| 20 | 21 | 22  | 23  | 24  | 25  | 26  | 27  |
| 20 | 21 | 22  | 23  | 24  | 25  | 26  | 27  |
| 21 | 22 | 23  | 25  | 25  | 26  | 27  | 28  |
| 95 | 95 | 100 | 100 | 100 | 100 | 100 | 105 |
| 6  | 6  | 6   | 6   | 6   | 6   | 6   | 6   |
| 50 | 50 | 50  | 50  | 50  | 55  | 55  | 55  |

Fig. 11

| | | | | | | | |
|---|---|---|---|---|---|---|---|
| 10 | 11 | 12 | 15 | 16 | 12 | 156 | 10 |
| 15 | 16 | 17 | 18 | 19 | 20 | 21 | 22 |
| 20 | 21 | 22 | 23 | 24 | 25 | 26 | 27 |
| 20 | 21 | 22 | 23 | 24 | 25 | 26 | 27 |
| 21 | 22 | 23 | 25 | 25 | 26 | 27 | 28 |
| 98 | 99 | 100 | 102 | 102 | 103 | 104 | 105 |
| 6 | 6 | 6 | 6 | 6 | 6 | 6 | 6 |
| 50 | 51 | 52 | 53 | 54 | 55 | 57 | 57 |

Fig. 12

| | | | | | | | |
|---|---|---|---|---|---|---|---|
| 10 | 10 | 10 | 10 | 10 | 10 | 150 | 10 |
| 10 | 10 | 10 | 10 | 10 | 20 | 20 | 20 |
| 20 | 20 | 20 | 20 | 20 | 20 | 20 | 20 |
| 20 | 20 | 20 | 20 | 20 | 20 | 20 | 20 |
| 20 | 20 | 22 | 24 | 20 | 20 | 20 | 20 |
| 90 | 90 | 100 | 102 | 100 | 100 | 100 | 100 |
| 0 | 0 | 0 | 0 | 0 | 0 | 0 | 0 |
| 50 | 50 | 50 | 50 | 50 | 50 | 50 | 50 |

QUANTIZATION APPARATUS, QUANTIZATION METHOD, AND PROGRAM

CROSS-REFERENCE TO RELATED APPLICATIONS

This application is a 371 U.S. National Phase of International Application No. PCT/JP2019/020468 filed on May 23, 2019. The entire disclosures of the above applications are incorporated herein by reference.

TECHNICAL FIELD

The present invention relates to a quantization apparatus, a quantization method, and a program.

BACKGROUND ART

There is a demand to extract semantic data from massive statistical data. As an image used to satisfy the demand, an image representing statistical data (hereinafter, referred to as "statistical image") is generated (see Patent Literature 1). Coordinates in the statistical image are associated with positions in a real space. A pixel value of a pixel in the statistical image represents statistical data at a position in the real space associated with the coordinates of the pixel.

For the purpose of compressing the capacity of such massive statistical data, pixel values of pixels of the statistical image may be quantized based on an image coding standard such as an HEVC (High Efficiency Video Coding) standard (see Non-patent Literature 1).

CITATION LIST

Patent Literature

Patent Literature 1: Japanese Patent Laid-Open No. 2018-128731

Non-Patent Literature

Non-Patent Literature 1: Sakae Okubo, et al. (three Authors), "Impress Standard Textbook Series H.265/HEVC Textbook", Impress Corporation, 2013, pp. 11-13

SUMMARY OF THE INVENTION

Technical Problem

Pixel values of pixels of a statistical image represent statistical data. Therefore, properties an image quality of the statistical image are not evaluated by humans. However, a conventional quantization method based on the image coding standard is a quantization method that emphasizes improvement of the image quality. In the conventional image coding standard, the same quantization parameter (QP) is used for all pixels in the statistical image, during quantization of pixel values, to emphasize the improvement of the image quality. The quantization parameter is a parameter used to determine a quantization width of a pixel value.

When the same quantization parameter is used for all pixels in the statistical image, statistical properties may not be maintained in the statistical image due to changes in a ratio (a relationship of sparseness and denseness) between statistical data represented by the pixel values. When the statistical data is, for example, a population, the influence of the quantization parameter on the pixel value differs greatly between the pixel value representing a large population in a city center and the pixel value representing a small population in a mountainous area. For example, when the quantization parameter is set according to the pixel value representing the large population in the city center, the respective pixel values representing a small population in the respective mountainous areas are averaged, so that no statistical difference remains between the pixel values representing the small population in the respective mountainous areas. Therefore, there is a case in which the pixel values of the pixels of the statistical image cannot be quantized and thus the statistical properties are not maintained.

In view of the above circumstances, the present invention is to provide a quantization apparatus, a quantization method, and a program capable of quantizing the pixel values of the pixels of the statistical image so as to maintain the statistical properties.

Means for Solving the Problem

An aspect of the present invention is a quantization apparatus including: an imaging unit that converts statistical data at a position in a real space into a pixel value of a coordinate, which is associated with the position, in an image; and a derivation unit that derives a quantization parameter corresponding to a quantization width of the pixel value for each of one or more positions in the real space with respect to a part or a whole of the image.

Effects of the Invention

According to the present invention, it is possible to quantize pixel values of pixels of a statistical image so as to maintain statistical properties.

BRIEF DESCRIPTION OF DRAWINGS

FIG. 2 is a view showing as example of a statistical image according to the first embodiment.

FIG. 3 is a view showing an example of a predictive image according to the first embodiment.

FIG. 4 is a view showing as example of a differential image according to the first embodiment.

FIG. 7 is a view showing an example of a differential decoded image according to the first embodiment.

FIG. 8 is a view showing an example of a decoded image according to the first embodiment.

FIG. 11 is a view showing an example of a statistical image according to the third embodiment.

FIG. 12 is a view showing an example of a predictive image according to the third embodiment.

DESCRIPTION OF EMBODIMENTS

Embodiments of the present invention will be described in detail with reference to the drawings.

First Embodiment

Figure 1:
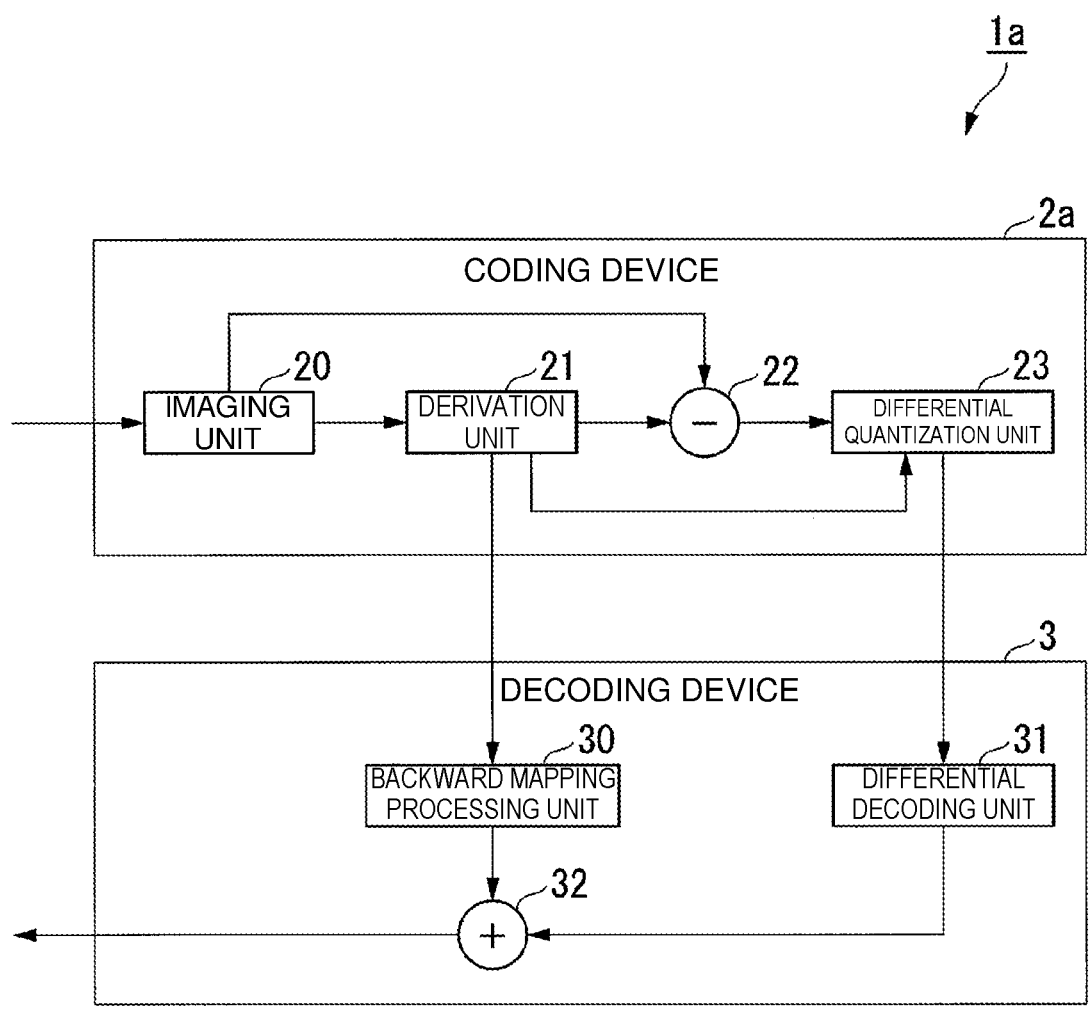
FIG. 1 is a diagram showing a configuration example of a quantization apparatus according to a first embodiment.

FIG. 1 is a diagram showing a configuration example of a quantization apparatus 1a. The quantization apparatus 1a is an apparatus that quantizes pixel values of pixels of a statistical image. Coordinates in the statistical image are associated with positions in a real space. The pixel value of the pixel in the statistical image represents statistical data at a position in the real space associated with the coordinates of such a pixel. The statistical data may be, for example, data representing the population or data representing the demand for taxis (for example, the number of allocated vehicles, the number of candidate passengers). Since the pixel value may not be within a permissible range, the statistical data may be converted into a value, in which the pixel value is within the permissible range, by execution of predetermined conversion processing on the statistical data. As the predetermined conversion processing, for example, conversion processing disclosed in the reference literature (Japanese Patent Laid-Open. No. 2017-123021) may be used.

The quantization apparatus 1a includes a coding device 2a (a quantization unit) and a decoding device 3 (an inverse quantization unit). The coding device 2a includes an imaging unit 20, a derivation unit 21, a subtraction unit 22, and a differential quantization unit 23. The decoding device 3 includes a backward mapping processing unit 30, a differential decoding unit 31, and an addition unit 32.

A part or all of the quantization apparatus 1a is realized as software by a processor such as a CPU (Central Processing Unit) executing a program stored in a memory which is a non-volatile recording medium (a non-temporary recording medium). The program may be recorded on a computer-readable recording medium. The computer-readable recording medium includes, for example, a potable medium such as a flexible disk, an optomagnetic disk, a ROM (Read Only Memory), or a CD-ROM (Compact Disc Read Only Memory) and a non-temporary storage medium such as a storage device of a hard disk built into a computer system. The program may be transmitted via a telecommunication line. A part or all of the quantization apparatus 1a may be implemented using hardware including an electronic circuit (or circuitry) using an LSI (Large Scale Integration circuit), an ASIC (Application Specific Integrated Circuit), a PLD (Programmable Logic Device), or an FPGA (Field Programmable Gate Array), for example.

The coding device 2a is a device that quantizes a statistical image expressed in an uncompressed image format (hereinafter, referred to as an "uncompressed statistical image") to code the quantized statistical image. The imaging unit 20 acquires statistical data associated with a position in the real space. The imaging unit. 20 generates, based on the statistical data, an uncompressed statistical image. The imaging unit 20 converts the statistical data at the position in the real space into a pixel value of a pixel of a coordinate i (x,y) associated with the position in the real space in the image. For example, the imaging unit 20 may generate a statistical image using the data processing method disclosed in the reference literature (Japanese Patent Laid-Open No. 2017-123021). The imaging unit 20 outputs the uncompressed statistical image to the derivation unit. 21 and the subtraction unit 22.

The derivation unit 21 acquires the uncompressed statistical image from the imaging unit 20. The derivation unit 21 executes prediction processing (for example, intra-prediction, time-direction prediction) on the uncompressed statistical image.

The derivation unit 21 derives a quantization parameter corresponding to a quantization width di of the pixel value of the uncompressed statistical image for each pixel of the coordinate i in a part or the whole of the statistical image. The longer the quantization width di, the larger the value of the quantization parameter. The derivation unit 21 derives a quantization parameter corresponding to the quantization width di that is longer as a pixel value Vi increases. The derivation unit 21 executes quantization processing on the pixel value Vi of the coordinate i of the statistical image with the quantization width di determined according to the quantization parameter defined for each pixel. The quantization width di is expressed by Expression (1).

$$di = f(Vi) \qquad (1)$$

Here, a symbol i is an index, and represents a coordinate in the statistical image corresponding to the position in the real space. A symbol Vi represents a pixel value of the coordinate i. A symbol f represents a predetermined proportional function.

The derivation unit 21 outputs the quantization parameter defined for each pixel to the differential quantization unit 23. The derivation unit 21 may output not the quantization parameter but the quantization width di to the differential quantization unit 23.

The derivation unit 21 outputs, to the backward mapping processing unit 30, an image feature amount data (hereinafter, referred to as "feature amount data") obtained as a result of the prediction processing for the statistical image including the pixel value quantized by the quantization width di for each pixel. The feature amount data (low-dimensional data) is data as a mapping result when high-dimensional data can be mapped to low-dimensional data by a predetermined function and backward mapping of the mapping result can also be calculated. The derivation unit 21 executes a backward mapping processing (processing of returning the feature amount data to high-dimensional data) on the feature amount data (low-dimensional data) obtained as a result of the prediction processing. The derivation unit 21 outputs a predictive image (a predictive signal) obtained as a result of the backward mapping processing to the subtraction unit 22.

The subtraction unit 22 acquires the uncompressed statistical image from the imaging unit 20. The subtraction unit 22 acquires the predictive, image obtained as a result of the backward mapping processing from the derivation unit 21. The subtraction unit 22 subtracts a pixel value of the predictive image from the pixel value of the uncompressed statistical image for each pixel. In other words, the subtraction unit 22 derives, for each pixel, an error value which is a difference between the pixel value (the pixel value of the uncompressed statistical image) not quantized by the quantization width di and the pixel value (the pixel value of the predictive image) quantized by the quantization width di (residual). The subtraction unit 22 outputs the subtraction result as a differential image to the differential quantization unit 23.

The differential quantization unit 23 (compression processing unit) acquires the differential image from the subtraction unit 22. The differential quantization unit 23 acquires the quantization parameter from the derivation unit 21. The differential quantization unit 23 quantizes the pixel value (error value) of the differential image with the quantization width di determined according to the quantization parameter defined for each pixel.

The differential quantization unit 23 detects pixels having error values in the range from a quantization width "−di" to a quantization width "+di" with a predetermined reference error value (for example, 0) as a center, from the differential image. In other words, the differential quantization unit 23 detects pixels, in which an absolute value of the pixel value (error value) of the differential image is equal to or less than an absolute value of a quantization width "))±di", from the differential image. The differential quantization unit 23 quantizes the error value of the pixel detected from the differential image to 0. The differential quantization unit 23 outputs the pixel value (hereinafter, referred to as "differential data") of the differential image to the differential decoding unit 31.

The differential quantization unit 23 leaves the error value of the pixel not detected from the differential image. The differential quantization unit 23 may replace an error value Vi within the range from the quantization width "+di" to a quantization width "D>(+di)" with an error value "+d". The replacement processing may be repeated by the differential quantization unit 23, and thereby a continuous error value may be replaced with a plurality of discrete error values.

The decoding device 3 is a device that decodes the compressed statistical image based on the coded statistical image. The backward mapping processing unit 30 acquires feature amount data from the derivation unit 21. The backward mapping processing unit 30 executes backward mapping processing on the feature amount data. In other words, the backward mapping processing unit 30 generates a predictive image based on the feature amount data. The backward mapping processing unit 30 outputs the predictive image obtained as a result of the backward mapping processing to the addition unit 32.

The differential decoding unit 31 acquires differential data from the differential quantization unit 23. The differential decoding unit 31 executes decoding processing such as inverse quantization on the differential data. The differential decoding unit 31 outputs, to the addition unit 32, the result of the decoding processing for the differential data (hereinafter, referred to as a "differential decoded image").

The addition unit 32 acquires feature amount data from the backward mapping processing unit 30. The addition unit 32 acquires the differential decoded image from the differential decoding unit 31. The addition unit 32 adds the pixel value of the feature amount data and the pixel value of the differential decoded image to each other for each pixel. The addition unit 32 derives the addition result as a statistical image (decoded image) expressed in a compressed image format. The addition unit 32 outputs the addition result to a predetermined external device.

An example of the quantization processing will be described below.

FIG. 2 is a view showing an example of a statistical image. In the following description, the statistical image is configured by "8×8" pixel groups as an example. In FIG. 2, the statistical image includes pixels 100 to 108. Hereinafter, values described in the pixels in the drawings represent pixel values, respectively. For example, a value "156" described in the pixel 100 in FIG. 2 represents a pixel value of the pixel 100.

The pixel value of the pixel 100 represents, as an example, the population of a first area that is not a depopulated area (for example, an urban area). The pixel value of the pixel 100 at coordinates (1,7) is "156" as an example. A pixel value of the pixel 101 represents, as an example, the population of a second area that is a depopulated area (for example, a mountainous area.). A pixel value of the pixel 101 at coordinates (7,1) is "6" as an example. Each of pixel values of the pixels 102 to 108 is "6" as an example.

Since the pixel value of the pixel 101 is smaller than the pixel value of the pixel 100, a permissible quantization error for the pixel value of the pixel 101 is smaller than a permissible quantization error for the pixel value of the pixel 100. If the same quantization width "10" is used at the time of quantization of the pixel value in all the pixels in the statistical image. The pixel value "6 (pixel value less than the quantization width "10")" of the pixel 101 becomes "0", and statistical properties of the depopulated area may not be maintained. In addition, the statistical properties of the statistical image may not be maintained due to changes in the ratio (relationship of sparseness and denseness) between the statistical data (values) represented by the respective pixel values.

The derivation unit 21 derives a quantization parameter for each pixel value in order to quantize the pixel values of the pixels of the statistical image so as to maintain the statistical properties of the depopulated area. For example, the derivation unit 21 derives a quantization parameter corresponding to the quantization width di that is larger as the pixel value Vi is larger.

In FIG. 2, the derivation unit 21 derives a quantization parameter corresponding to a quantization width "1" less than a threshold value for a pixel having a pixel value less than "50" as an example. The derivation unit 21 derives a quantization parameter corresponding to a quantization width "10" equal to or larger than the threshold value for a pixel having a pixel value of "50" or more as an example.

FIG. 3 is a view showing an example of a predictive image. In the following description, the predictive image is configured by "8×8" pixel groups as an example. The derivation unit 21 quantizes pixel values of pixels of the statistical image having a pixel value less than "50" with a quantization width "1". The derivation unit 21 quantizes pixel values of pixels of the statistical image having a pixel value of "50" or more and less than "150" with a quantization width "5". The derivation unit 21 quantizes pixel values of pixels of the statistical mage having a pixel value of "150" or more with a quantization width "10".

as a result of the quantization with the quantization width "10", the pixel value of the pixel 100 of the predictive image becomes "150". As a result of the quantization with the quantization width "1", each of pixel values of pixels 101 to 108 of the predictive image remains to be "6".

Figure 4:
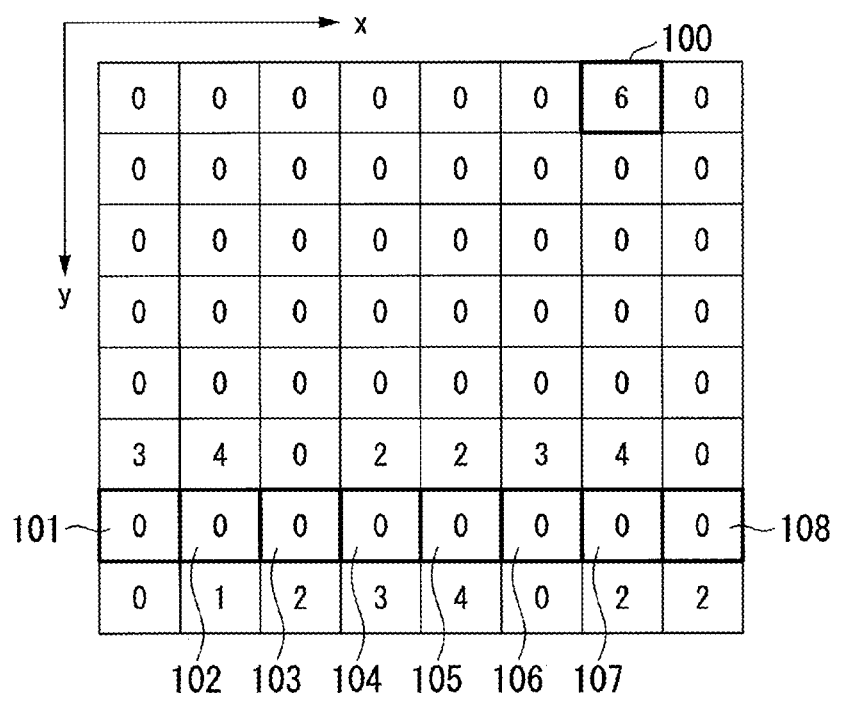

FIG. 4 is a view showing an example of a differential image. In the following description, the differential image is configured by "8×8" pixel groups as an example. The differential image shown in FIG. 4 represents a result (error value) obtained by subtracting the pixel value of the predictive image from the pixel value of the statistical image. A pixel value of a pixel 100 of the differential image is "6 (=156−150)". Each of pixel values of pixels 101 to 108 of the predictive image is "0 (=6−6)".

Figure 5:
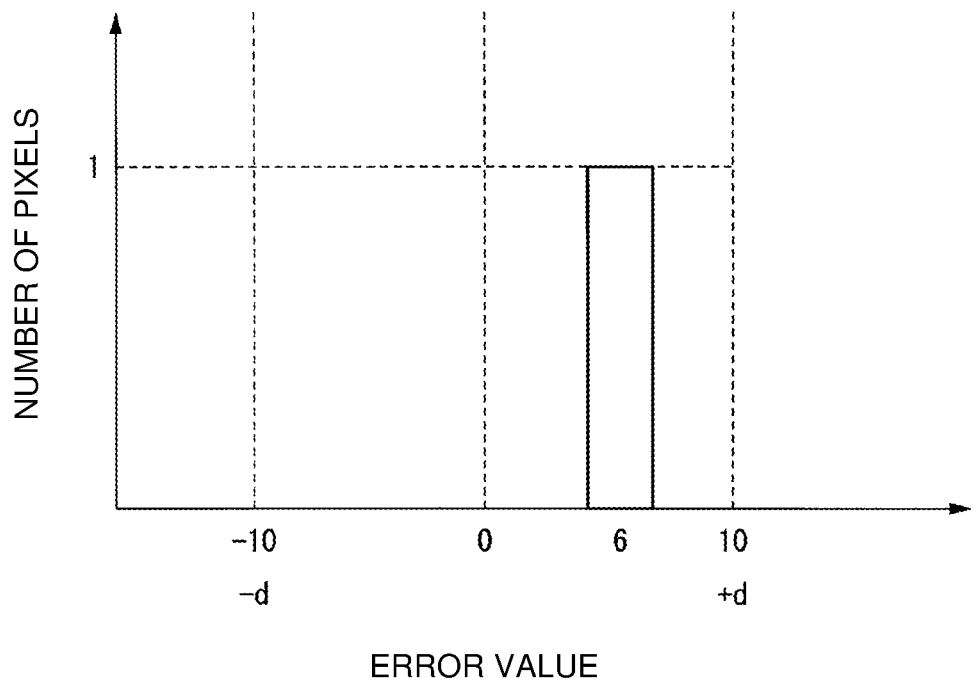
FIG. 5 is a view showing an example of a pixel value of a predetermined pixel of the differential image according to the first embodiment.

FIG. 5 is a view (histogram) showing an example of the pixel value (error value) of the pixel 100 of the differential image. A horizontal axis indicates pixel values (error values) of pixels quantized with the quantization width "10" in the differential image. A vertical axis indicates, for each pixel value (error value), the number of pixels quantized with the quantization width "10" in the differential image.

The differential quantization unit 23 compares with the absolute value to detect pixels 100 having a pixel value "6" that is equal to or less than the quantization width "10" in the differential image. The differential quantization unit 23 quantizes the pixel value "6" of the pixel 100 detected in the differential image to 0.

Figure 6:
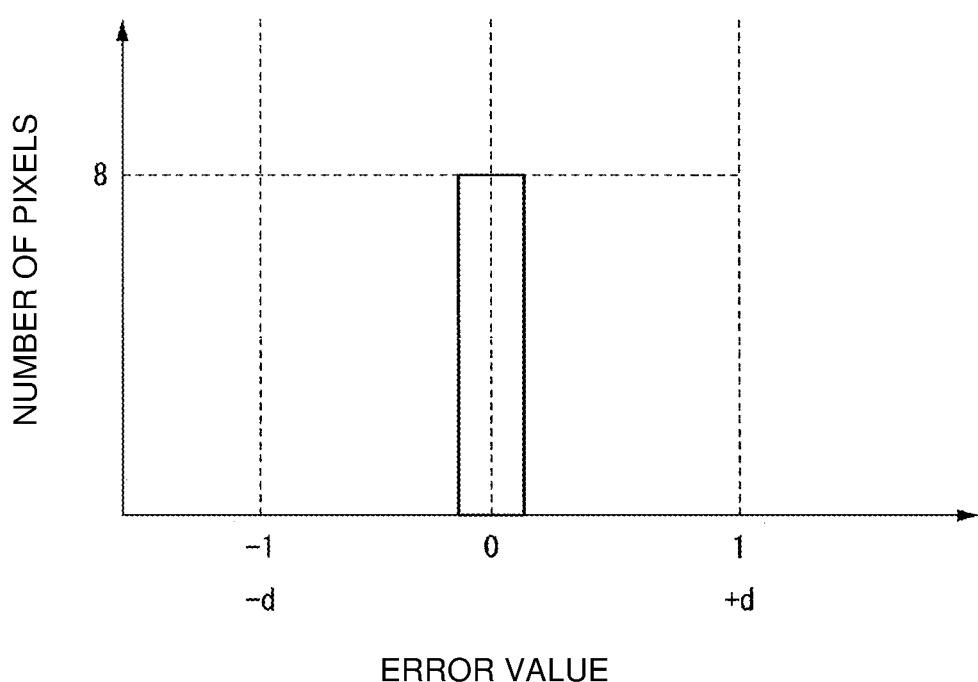
FIG. 6 is a view showing an example of each pixel value of a predetermined pixel group of the differential image according to the first embodiment.

FIG. 6 is a view (histogram) showing an example of pixel values (error values) of pixels 101 to 108 of the differential image. A horizontal axis indicates pixel values (error values) of pixels quantized with the quantization width "1" in the differential image. A vertical axis indicates, for each pixel value (error value), the number of pixels quantized with the quantization width "1" in the differential image.

The differential quantization unit 23 compares with the absolute value to detect pixels 100 having a pixel value "0" that is equal to or less than the quantization width "1" in the differential image. The differential quantization unit 23 quantizes each of the pixel values "6" of the pixels 101 to 108 detected in the differential image to 0.

FIG. 7 is a view showing an example of a differential decoded image. Since differential quantization unit 23 quantizes the pixel value "6" of the pixel 100 of the differential image to 0, the pixel value of the pixel 100 in the differential data becomes 0. Since the differential quantization unit 23 quantizes each of the pixel values "6" of the pixels 101 to 108 of the differential image to 0, each of the pixel values of the pixels 101 to 108 in the differential data becomes 0. The differential decoding unit 31 executes decoding processing on the differential data, thereby generating the differential decoded image shown in FIG. 7.

FIG. 8 is a view showing an example of a decoded image. The addition unit 32 adds the predictive image shown in FIG. 3 and the differential decoded image shown in FIG. 7 for each pixel, thereby generating the decoded image (compressed statistical image) shown in FIG. 8. In the decoded image shown in FIG. 8, since each of pixel values of pixels 101 to 108 is not "0", the statistical properties of the depopulated area are maintained. In the decoded image, since the ratio of the statistical data (pixel values) represented by the pixel 100 and the pixels 101 to 108 is almost the same as the ratio of the statistical data represented by the pixel 100 and the pixels 101 to 108 in the statistical image, the statistical properties are maintained in the decoded image.

An operation example of the quantization apparatus 1a will be described below.

Figure 9:
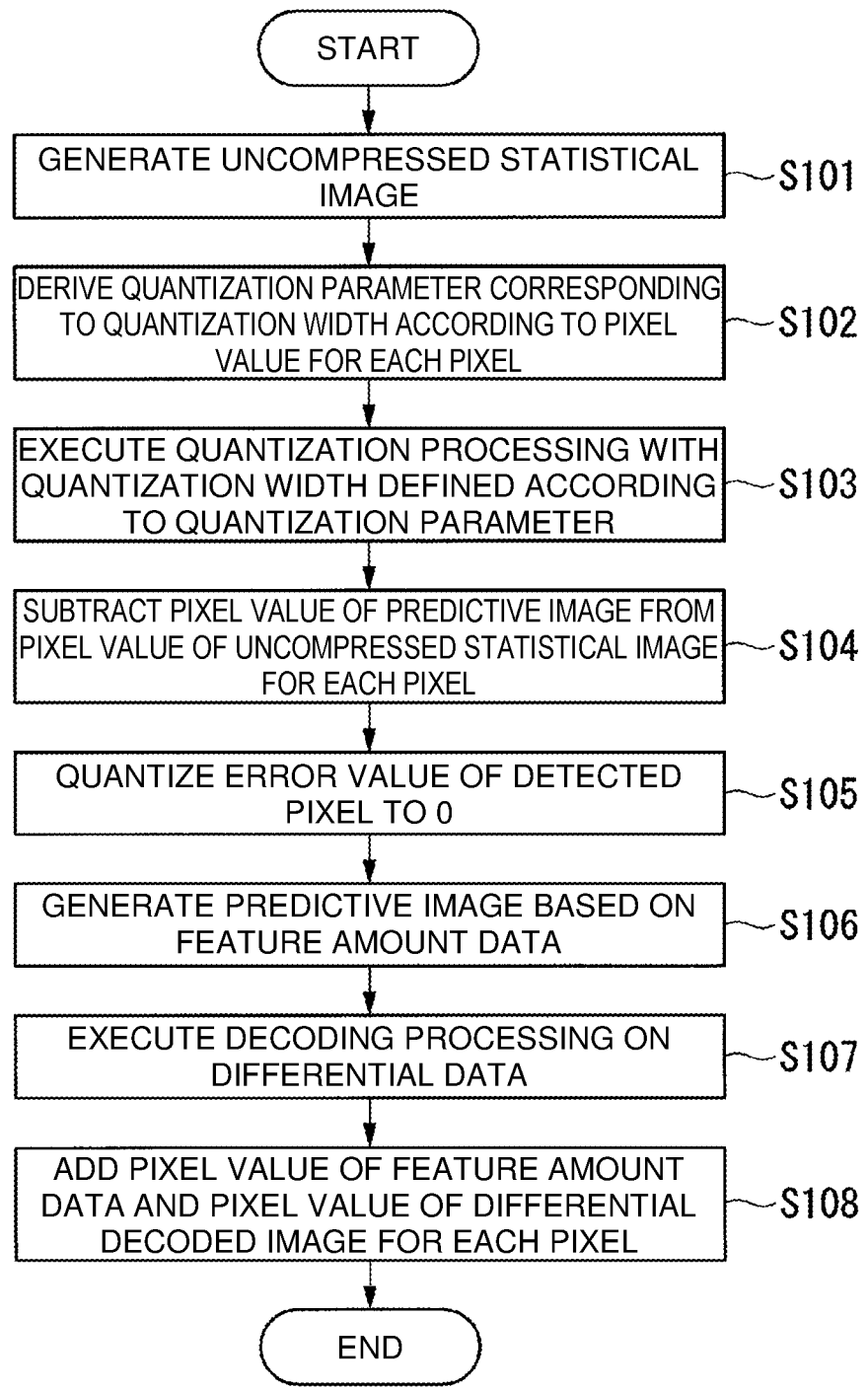
FIG. 9 is a flowchart showing an operation example of the quantization apparatus according to the first embodiment.

FIG. 9 is a flowchart showing an operation example of the quantization apparatus 1a. The imaging unit 20 acquires statistical data for each position in the real space. The imaging unit 20 generates, based on the statistical data, an uncompressed statistical image. The imaging unit 20 outputs the uncompressed statistical image to the derivation unit 21 and the subtraction unit 22 (step S101).

The derivation unit 21 acquires the uncompressed statistical image. The derivation unit 21 derives a quantization parameter corresponding to a quantization width according to the pixel value for each pixel of the coordinate i in a part or the whole of the uncompressed statistical image. The derivation unit 21 outputs the quantization parameter to the differential quantization unit 23 for each pixel (step S102).

The derivation unit 21 executes quantization processing on the pixel value Vi of the coordinate i of the statistical image with the quantization width di determined according to the quantization parameter defined based on the pixel value for each pixel. The derivation unit 21 outputs feature amount data obtained as a result of the quantization processing to the backward mapping processing unit 30 (step S103).

The subtraction unit 22 acquires the uncompressed statistical image from the imaging unit 20. The subtraction unit 22 acquires the predictive image obtained as a result of the backward mapping processing from the derivation unit 21. The subtraction unit 22 subtracts the pixel value of the predictive image from the pixel value of the uncompressed statistical image for each pixel. The subtraction unit 22 outputs the subtraction result, as a differential image, to the differential quantization unit 23 (step S104).

The differential quantization unit 23 acquires the differential image from the subtraction unit 22. The differential quantization unit 23 acquires the quantization parameter from the derivation unit 21. The differential quantization unit 23 detects pixels, in which an absolute value of the pixel value (error value) of the differential image is equal to or less than an absolute value of a quantization width "±di", from the differential image. The differential quantization unit quantizes the error value of the pixel detected from the differential image to 0. The differential quantization unit 23 outputs the differential data to the differential decoding unit 31 (step S105).

The backward mapping processing unit 30 acquires feature amount data from the derivation unit 21. The backward mapping processing unit 30 generates a predictive image based on the feature amount data. The backward mapping processing unit 30 outputs the predictive image obtained as a result of the backward mapping processing to the addition unit 32 (step S106).

The differential decoding unit 31 acquires the differential data from the differential quantization unit 23. The differential decoding unit 31 executes decoding processing such as inverse quantization on the differential data. The differential decoding unit 31 outputs the differential decoded image to the addition unit 32 (step S107).

The addition unit 32 acquires the feature amount data from the backward mapping processing unit 30. The addition unit 32 acquires the differential decoded image from the differential decoding unit 31. The addition unit 32 adds the pixel value of the feature amount data and the pixel value of the differential decoded image to each other for each pixel. The addition unit 32 outputs the addition result to a predetermined external device (step S108).

As described above, the quantization apparatus 1a of the first embodiment includes the imaging unit 20 and the derivation unit 21. The imaging unit 20 converts the statistical data at the position in the real space into the pixel value of the coordinates associated with the position in the statistical image. The derivation unit 21 derives, for each position (pixel) in a spatial region with respect to a part or the whole of the statistical image, the quantization parameter corresponding to the quantization width of the pixel value.

Thus, it is possible to quantize the pixel values of the pixels of the statistical image so as to maintain the statistical properties (features).

The derivation unit 21 may derive the quantization parameter corresponding to the quantization width "di=f(Vi)" that is larger as the pixel value Vi of the coordinate i is larger. The differential quantization unit 23 quantizes the error value which is a difference between the pixel value not quantized with the quantization width and the pixel value quantized with the quantization width in the differential image. The differential quantization unit 23 may detect pixels in which the absolute of the pixel value (error value) of the differential image is equal to or less than the absolute of the quantization width "±di". The differential quantization unit may quantize the error value of the detected pixel to 0.

Second Embodiment

A second embodiment is different from the first embodiment in that a pixel value Vi is quantized with a quantization width di determined according to quantization parameters defined for each of a plurality of pixels (regions). In the second embodiment, differences from the first embodiment will be described.

The derivation unit 21 derives a quantization parameter corresponding to a quantization width di of a pixel value of an uncompressed statistical image for each pixel of a plurality of coordinates i in a part or the whole of a statistical image. The derivation unit 21 executes quantization processing on pixel values Vi of the plurality of coordinates i of the statistical image with a quantization width di determined according to the quantization parameter defined for each of the plurality of pixels. The quantization width di is expressed by Expression (2).

$$di=f(Ai) \qquad (2)$$

Here, a symbol i is an index and represents coordinates in a statistical image corresponding to a position in a real space. A symbol Ai represents an average value of pixel values Vi of a plurality of coordinates i. A symbol f represents a predetermined proportional function. The proportional function "f" is expressed by a function exemplified in Expression (3).

$$f(Vi)=a \times Vi+b \qquad (3)$$

Here, a symbol a represents a predetermined coefficient. A symbol b represents a predetermined constant.

The derivation unit 21 outputs the quantization parameter defined for each region including the plurality of pixels to the differential quantization unit 23. The derivation unit 21 may output, instead of the quantization parameter, the quantization width di to the differential quantization unit 23.

The differential quantization unit 23 (the compression processing unit) acquires the differential image from the subtraction unit 22. The differential quantization unit 23 acquires the quantization parameter defined for each region including the plurality of pixels from the derivation unit 21. The differential quantization unit 23 quantizes the pixel value (error value) of the differential image with the quantization width di determined according to the quantization parameter defined for each region including the plurality of pixels.

As described above, the quantization apparatus 1a of the second embodiment includes the imaging unit 20 and the derivation unit 21. The imaging unit 20 converts the statistical data at the position in the real space into the pixel value of the coordinates associated with the position in the statistical image. The derivation unit 21 derives, for each position (region) in a plurality of spatial regions with respect to a part or the whole of the statistical image, the quantization parameter corresponding to the quantization width of the pixel value.

Thus, it is possible to quantize the pixel values of the pixels of the statistical image so as to maintain the statistical properties in units of the plurality of pixels (regions).

Third Embodiment

A third embodiment is different from the first and second embodiments in that a quantization parameter is defined corresponding to a quantization width according to an operation mode (purpose information). In the third embodiment, differences from the first and second embodiments will be described.

Figure 10:
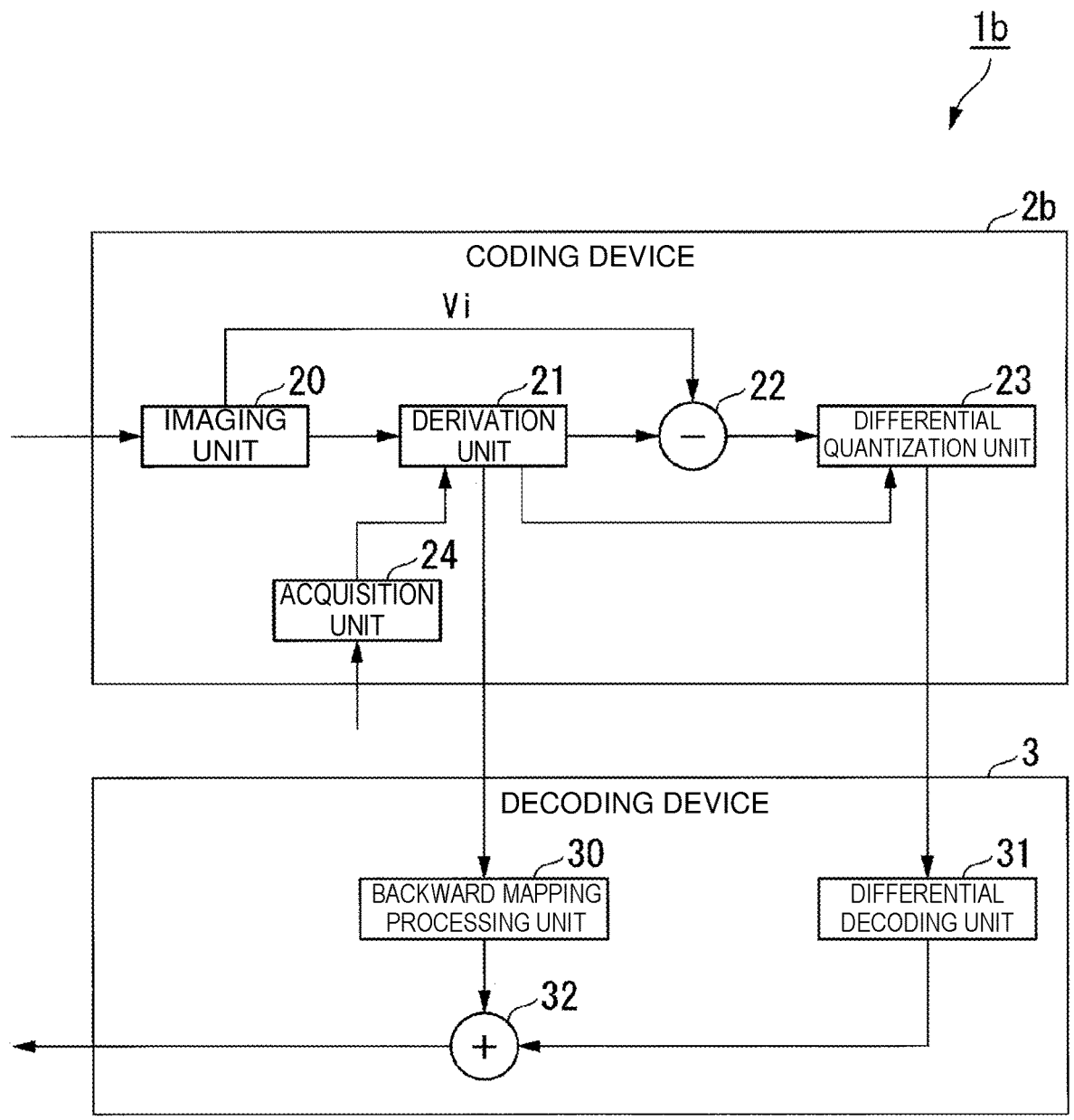
FIG. 10 is a diagram showing a configuration example of a quantization apparatus according to a third embodiment.

FIG. 10 is a diagram showing a configuration example of a quantization apparatus 1b. The quantization apparatus 1b is an apparatus that quantizes a pixel value of each of pixels of a statistical image. The quantization apparatus 1b includes a coding device 2b and a decoding device 3. The coding device 2b includes an imaging unit 20, a derivation unit 21, a subtraction unit 22, a differential quantization unit 23, and an acquisition unit 24. The decoding device 3 includes a backward mapping processing unit 30, a differential decoding unit 31, and an addition unit 32.

The acquisition unit 24 (purpose acquisition unit) is, for example, an input device such as a keyboard or a touch panel. The acquisition unit 24 acquires an operation mode and coordinate data. The quantization parameter is defined according to the operation mode. The operation mode is determined in advance by the user according to the purpose of statistical processing. The purpose of statistical processing is, for example, to obtain statistical data on demand for determining which of a plurality of positions (regions) in the real space to allocate more taxis.

For example, it is assumed that all of the population of residential areas, the population of office areas, and the population of downtown areas will be high in urban areas at night. Even in areas with similarly high populations, as people return to the residential areas on weekday nights, the population of the residential areas will increase, and the populations of both the office areas and the downtown areas will decrease. In other words, a flow of people occurs from the office district and the downtown area as a starting point. Since many taxis are preferably allocated at the starting point of the flow of people, it is desirable that the population of each of the office district and the downtown area be derived with higher accuracy. A value of the quantization parameter of each pixel corresponding to the office district and the downtown area is set to a value smaller than a value of the quantization parameter of each pixel corresponding to the residential area and the depopulated area such that the population of each of the office district and the downtown area is derived with higher accuracy.

A permissible quantization error for the pixel value of the coordinate associated with a position where the statistical data needs to be obtained is smaller than a permissible quantization error for the pixel value of the coordinate associated with a position where the statistical data does not need to be obtained. Therefore, the pixel value of the coordinate associated with a position where the statistical data needs to be obtained is quantized with a quantization width smaller than a predetermined threshold value.

The coordinate data represents coordinates of one or more pixels corresponding to one or more positions where the statistical data needs to be obtained in the statistical image. The coordinate data may represent coordinates of one or more pixels corresponding to one or more positions where the statistical data does not need to be obtained in the statistical image. The acquisition unit 24 outputs the operation mode and the coordinate data to the derivation unit 21.

The derivation unit 21 acquires the operation mode and the coordinate data. The derivation unit 21 acquires the uncompressed statistical image from the imaging unit 20. The derivation unit 21 derives, for each pixel of the coordinate i indicated by the coordinate data, a quantization parameter corresponding to the quantization width di of the pixel value of the uncompressed statistical image.

When the coordinate data indicates the coordinates associated with the position where the statistical data needs to be obtained, the derivation unit 21 derives, for each pixel of one or more coordinates i indicated by the coordinate data, a quantization parameter having a value less than the threshold value. When the coordinate data indicates the coordinates associated with the position where the statistical data does not need to be obtained, the derivation unit 21 derives, for each pixel of one or more coordinates i indicated by the coordinate data, a quantization parameter having a value equal to or more than the threshold value.

A quantization width corresponding to the quantization parameter having the value less than the threshold value is shorter than a quantization width corresponding to the quantization parameter having the value equal to or more than the threshold value. The derivation unit 21 executes quantization processing on the pixel value Vi of the coordinate i of the statistical image, with the quantization width di determined according to the quantization parameter defined for each pixel.

An example of the quantization processing will be described below.

FIG. 11 is a view showing an example of a statistical image. In FIG. 11, the statistical image includes pixels 200 to 203. The pixels 200 to 203 are pixels with coordinates associated with each position (each region) for which statistical data needs to be obtained.

A pixel value of the pixel 200 represents the number of taxis to be demanded in a third region, as an example. The pixel value of the pixel 200 at coordinates (3,5) is "23" as an example. A pixel value of the pixel 201 represents the number of taxis to be demanded in a fourth region, as an example. The pixel value of the pixel 201 at coordinates (4,5) is "25" as an example. A pixel value of the pixel 202 represents the number of taxis to be demanded in a fifth region, as an example. The pixel value of the pixel 202 at coordinates (3,6) is "100" as an example. A pixel value of the pixel 203 represents the number of taxis to be demanded in a sixth region, as an example. The pixel value of the pixel 203 at coordinates (4,6) is "102" as an example.

A permissible quantization error for each of the pixel values of the pixels 200 to 203 is smaller than a permissible quantization error for pixel values of pixels other than the pixels 200 to 203 in the statistical image. If the same quantization width "10" is used at the time of quantization of the pixel value in all the pixels in the statistical image, the statistical properties of the statistical image may not be maintained due to changes in the ratio (relationship of sparseness and denseness) between the statistical data (values) represented by the respective pixel values.

In order to quantize the pixel values of the pixels of the statistical image so as to maintain the statistical properties in each areas where the statistical data needs to be obtained, the derivation unit 21 derives, for each of the pixel values of the pixels 200 to 203, a quantization parameter corresponding to a quantization width (for example, 2) less than a threshold value. The derivation unit 21 may derive, for each of the pixel values of the pixels other than the pixels 200 to 203, a quantization parameter corresponding to a quantization width (for example, 10) equal to or more than the threshold value.

FIG. 12 is a view showing an example of a predictive image. The derivation unit 21 quantizes the pixel values of the pixels 200 to 203 with the quantization width "2" less than the threshold value, for example. The derivation unit 21 quantizes the pixel values of the pixels other than the pixels 200 to 203 with the quantization width "10" equal to or more than the threshold value. As a result of the quantization with the quantization width "2", the pixel value of the pixel 200 of the predictive image becomes "22". The pixel value of the pixel 201 of the predictive image becomes "24".

Figures 13, 14:
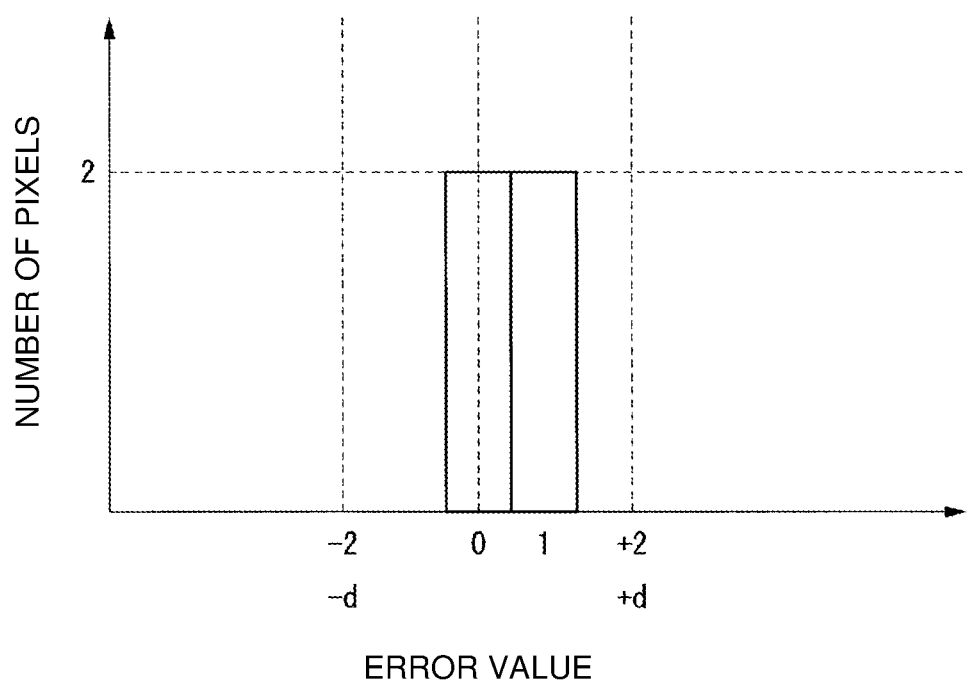
FIG. 13 is a view showing an example of a differential image according to the third embodiment.
FIG. 14 is a view showing an example of each pixel value of a predetermined pixel group of the differential image according to the third embodiment.

FIG. 13 is a view showing an example of a differential image. The differential image shown in FIG. 13 represents a result (error value) obtained by subtracting the pixel value of the predictive image from the pixel value of the statistical image. A pixel value of a pixel 200 of the differential image is "1 (=23−22)". A pixel value of a pixel 201 of the differential image is "1 (=25−24)". A pixel value of a pixel 202 of the differential image is "0 (=100−100)". A pixel value of a pixel 203 of the differential image is "0 (=102−102)".

FIG. 14 is a view (histogram) showing an example of the pixel values of the predetermined pixel group (pixels 200 to 203) of the differential image. A horizontal axis indicates pixel values (error values) of pixels 200 to 203 quantized with the quantization width "2" in the differential image. A vertical axis indicates, for each pixel value (error value), the number of pixels 200 to 203 quantized with the quantization width "2" in the differential image.

The differential quantization unit 23 compares with the absolute values of the pixel values of the pixels 200 to 203 indicated by the coordinate data in the differential image to detect pixels having a pixel value that is equal to or less than the quantization width "2" in the differential image. The differential quantization unit 23 quantizes the pixel values of the pixels detected in the differential image to 0. The differential quantization unit 23 may quantize with a quantization width "10" so as to set the pixel values of the pixels other than the pixels 200 to 203 in the differential image to 0.

Figure 15:
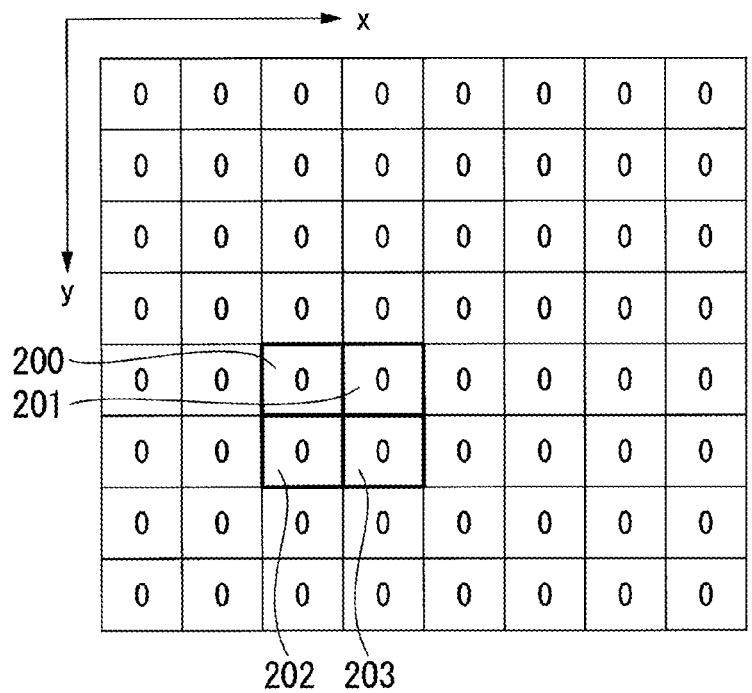
FIG. 15 is a view showing an example of an image representing differential data according to the third embodiment.

FIG. 15 is a view showing an example of an image indicating differential data. The pixel value "1" of the pixels 200 and 201 of the differential image is quantized to 0 by the differential quantization unit 23, so that the pixel value of the pixel 200 in the differential data becomes 0. The differential decoding unit 31 executes decoding processing on the differential data to generate a differential decoded image shown in FIG. 15.

Figure 16:
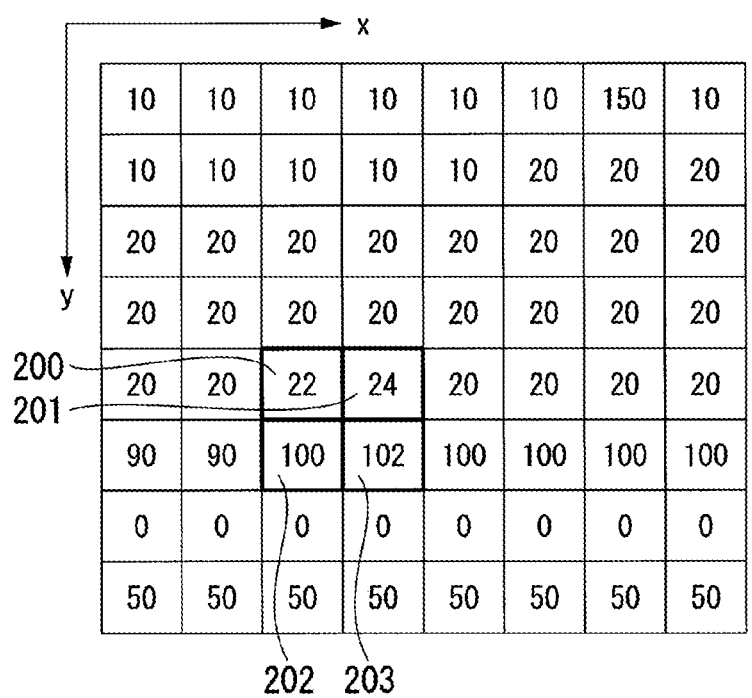
FIG. 16 is a view showing an example of a decoded image according to the third embodiment.

FIG. 16 is a view showing an example of a decoded image. The predictive image shown in FIG. 12 and the differential decoded image shown in FIG. 15 are added for each pixel, thereby generating the decoded image (compressed statistical image) shown in FIG. 16. In the decoded image shown in FIG. 16, since the ratio of the statistical data (pixel values) represented by the pixels 200 to 203 in the decoded image is almost the same as the ratio of the statistical data represented by the pixels 200 to 203 in the statistical image, the statistical properties are maintained in the decoded image.

An operation example of the quantization apparatus 1b will be described below.

Figure 17:
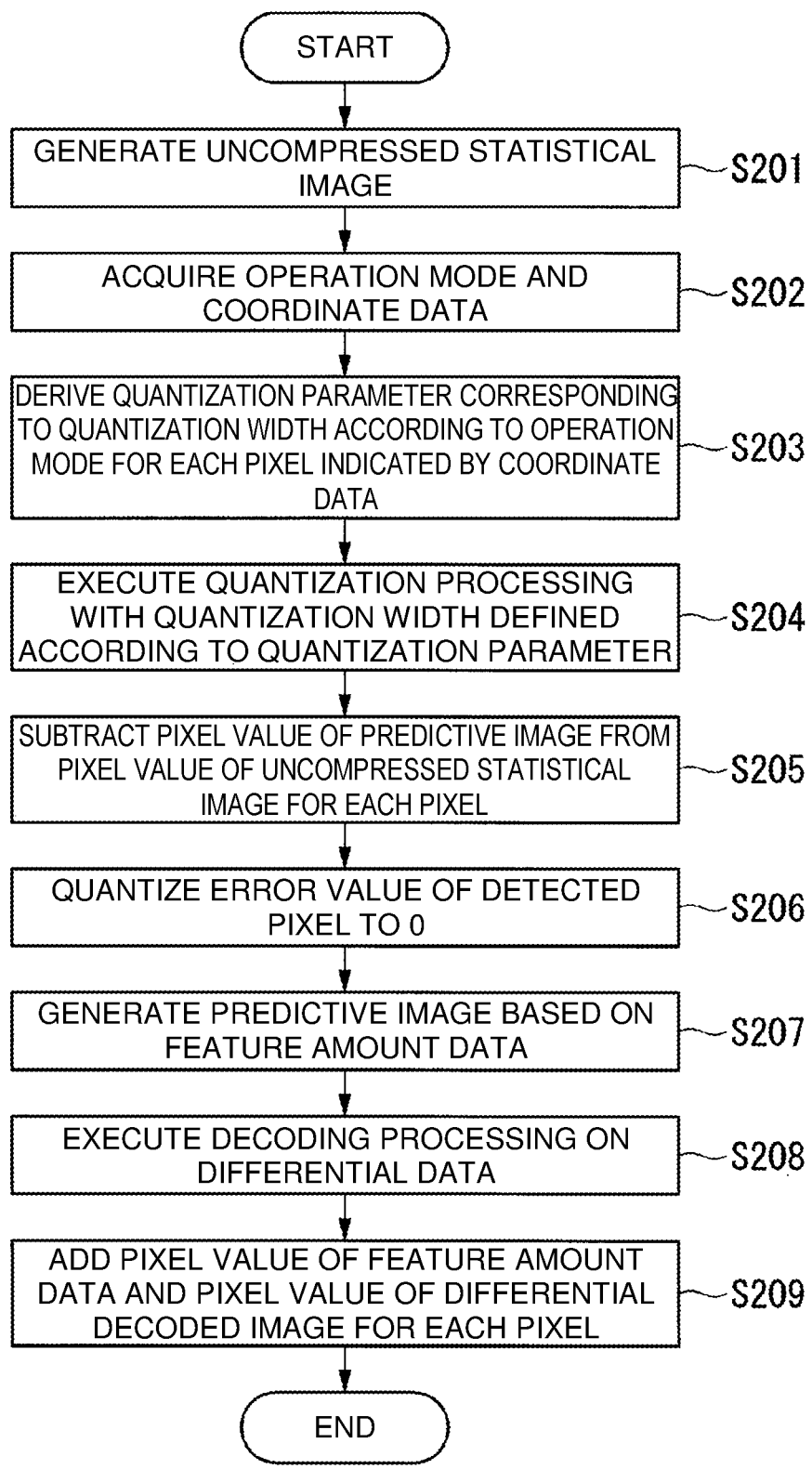
FIG. 17 is a flowchart showing an operation example of the quantization apparatus according to the third embodiment.

FIG. 17 is a flowchart showing an operation example of the quantization apparatus 1b. Step S201 shown in FIG. 17 is the same operation as step S101 shown in FIG. 9. The acquisition unit 24 acquires the operation mode and the coordinate data. The acquisition unit 24 outputs the operation mode and the coordinate data to the derivation unit 21 (step S202).

The derivation unit 21 acquires the operation mode and the coordinate data. The derivation unit 21 derives the quantization parameter corresponding to the quantization width according to the operation mode for each pixel indicated by the coordinate data. The derivation unit 21 outputs the quantization parameter to the differential quantization unit 23 for each pixel (step S203). Step S201 shown in FIG. 17 is the same operation as step S101 shown in FIG. 9.

As described above, the quantization apparatus 1b of the third embodiment further includes the imaging unit 20, the derivation unit 21, and the acquisition unit 24. The acquisition unit 24 acquires information (for example, the operation mode) indicating the purpose of the statistical processing. The derivation unit 21 derives the quantization parameter based on the position in the real space and the information indicating the purpose of the statistical processing.

Thus, it is possible to quantize the pixel values of the pixels of the statistical image so as to maintain the statistical properties according to the operation mode (the purpose of the statistical processing).

For example, even when the detailed statistical data is required only for a predetermined area regardless of the absolute number of population in each area, it is possible to quantize the pixel values of the pixels of the statistical image so as to maintain the statistical properties for the predetermined area.

For example, even when more detailed statistical data is required for areas with a large absolute number of passenger candidates in the statistical processing for controlling taxi allocation, it is possible to quantize the pixel values of the pixels of the statistical image so as to maintain the statistical properties for the areas with a large absolute number of passenger candidates.

Modification

Each function "f" shown Equations (1) and (2) or Equation (3) may be a function other than the proportional function. When there are multiple reference values (centers of the distribution range of the pixel values) of the plurality of quantized pixel values in the statistical image, the quantization width may be determined for each reference value of the plurality of quantized pixel values. The reference value of the plurality of pixel values quantized in the statistical image may be determined according to the distribution range of the plurality of pixel values quantized in the statistical image and the plurality of pixel values (error values) quantized in the differential image. The function "f" may be a function shown in Expression (4) expressed using a logarithm "log", for example.

$$f(Vi) = a \times \log(Vi) \quad (4)$$

Compared with the functions of Expressions (1), (2), and (3), the function of Expression (4) can increase the change of the quantization width with the change of the value. In other words, the function of Expression (4) can maintain the accuracy of extremely large values. The function of Expression (4) may be expressed using, for example, an exponentiation instead of being expressed using logarithms.

Although the embodiments of the present invention have been described in detail with reference to the drawings, the specific configuration is not limited to these embodiments, and includes designs within a range that does not deviate from the gist of the present invention.

INDUSTRIAL APPLICABILITY

The present invention is applicable to an image processing apparatus that performs image coding and image decoding.

REFERENCE SIGNS LIST 1a, 1b Quantization apparatus
2a, 2b Coding device
20 Imaging unit
21 Derivation unit
22 Subtraction unit
23 Differential quantization unit
24 Acquisition unit
30 Backward mapping processing unit
31 Differential decoding unit
32 Addition unit
100-108 Pixel
200-203 Pixel

The invention claimed is:

1. A quantization apparatus comprising:
a processor; and
a storage medium having computer program instructions stored thereon, when executed by the processor, perform to:
convert statistical data at a position in a real space into a pixel value of a coordinate, which is associated with the position, in an image;
derive a quantization parameter corresponding to a quantization width of the pixel value for each of one or more positions in the real space with respect to a part or a whole of the image;
quantize an error value that is a difference between the pixel value not quantized with the quantization width and the pixel value quantized with the quantization width;
detect a pixel in which an absolute value of the error value is equal to or less than an absolute value of the quantization width; and
quantize the error value of the detected pixel to 0.

2. The quantization apparatus according to claim 1, wherein the computer program instructions further perform to acquire information indicating a parameter of statistical processing, and derive the quantization parameter based on the position in the real space and the information indicating the parameter of the statistical processing.

3. The quantization apparatus according to claim 1, wherein the computer program instructions further perform to derive the quantization parameter corresponding to the quantization width that is larger as the pixel value is larger.

4. A non-transitory computer-readable medium having computer-executable instructions that, upon execution of the instructions by a processor of a computer, cause the computer to function as the quantization apparatus according to claim 1.

5. A quantization method to be executed by a quantization apparatus, comprising:
converting statistical data at a position in a real space into a pixel value of a coordinate, which is associated with the position, in an image;

deriving a quantization parameter corresponding to a quantization width of the pixel value for each of one or more positions in the real space with respect to a part or a whole of the image;

quantizing an error value that is a difference between the pixel value not quantized with the quantization width and the pixel value quantized with the quantization width;

detecting a pixel in which an absolute value of the error value is equal to or less than an absolute value of the quantization width; and quantizing the error value of the detected pixel to 0.

* * * * *